Sept. 9, 1958 F. W. SCHEIFELE 2,851,234
FISHING ROD SUPPORT
Filed Feb. 23, 1952 3 Sheets-Sheet 1
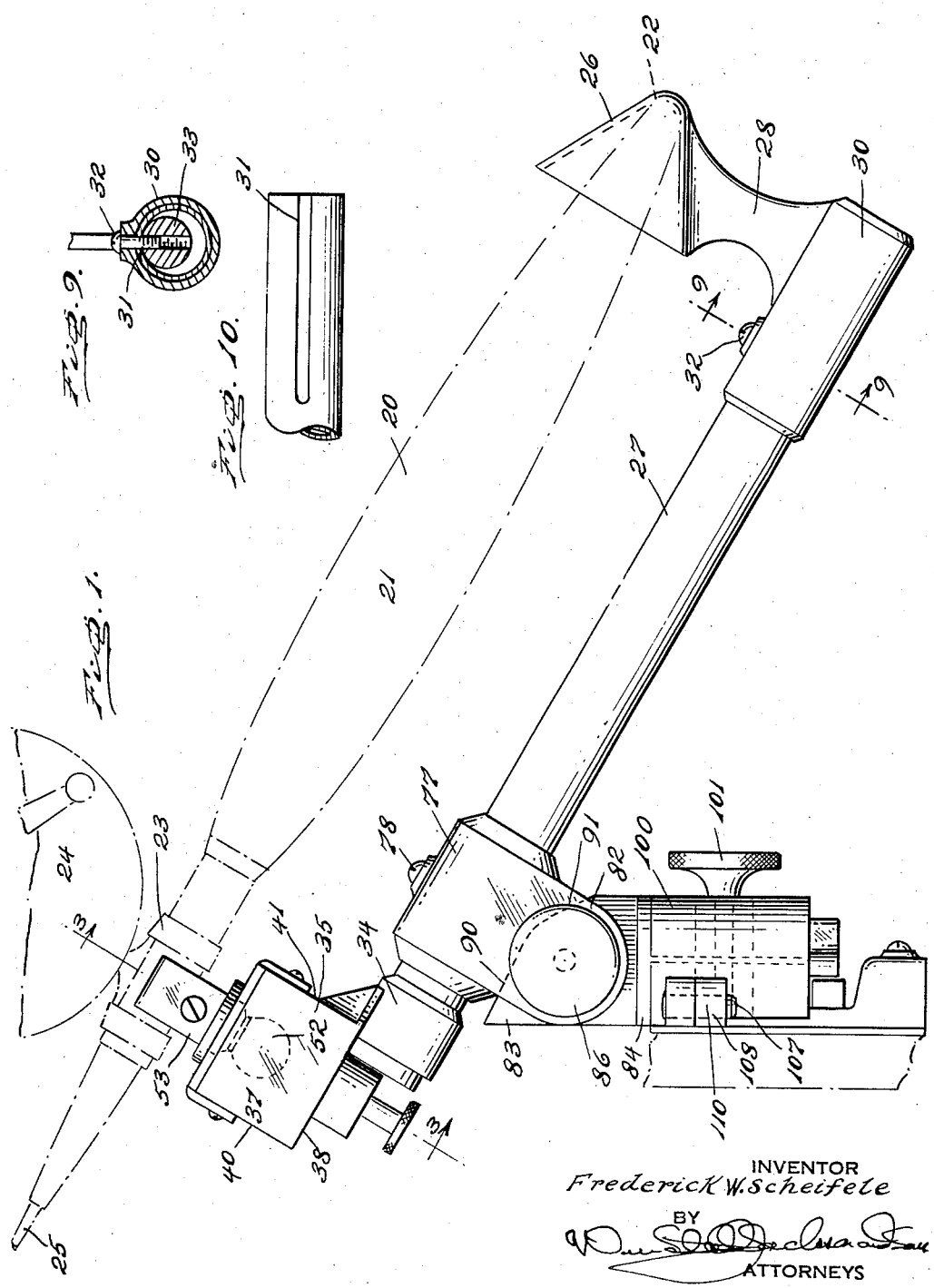
INVENTOR
Frederick W. Scheifele
BY
ATTORNEYS Sept. 9, 1958　　　F. W. SCHEIFELE　　　2,851,234
FISHING ROD SUPPORT
Filed Feb. 23, 1952　　　3 Sheets-Sheet 2
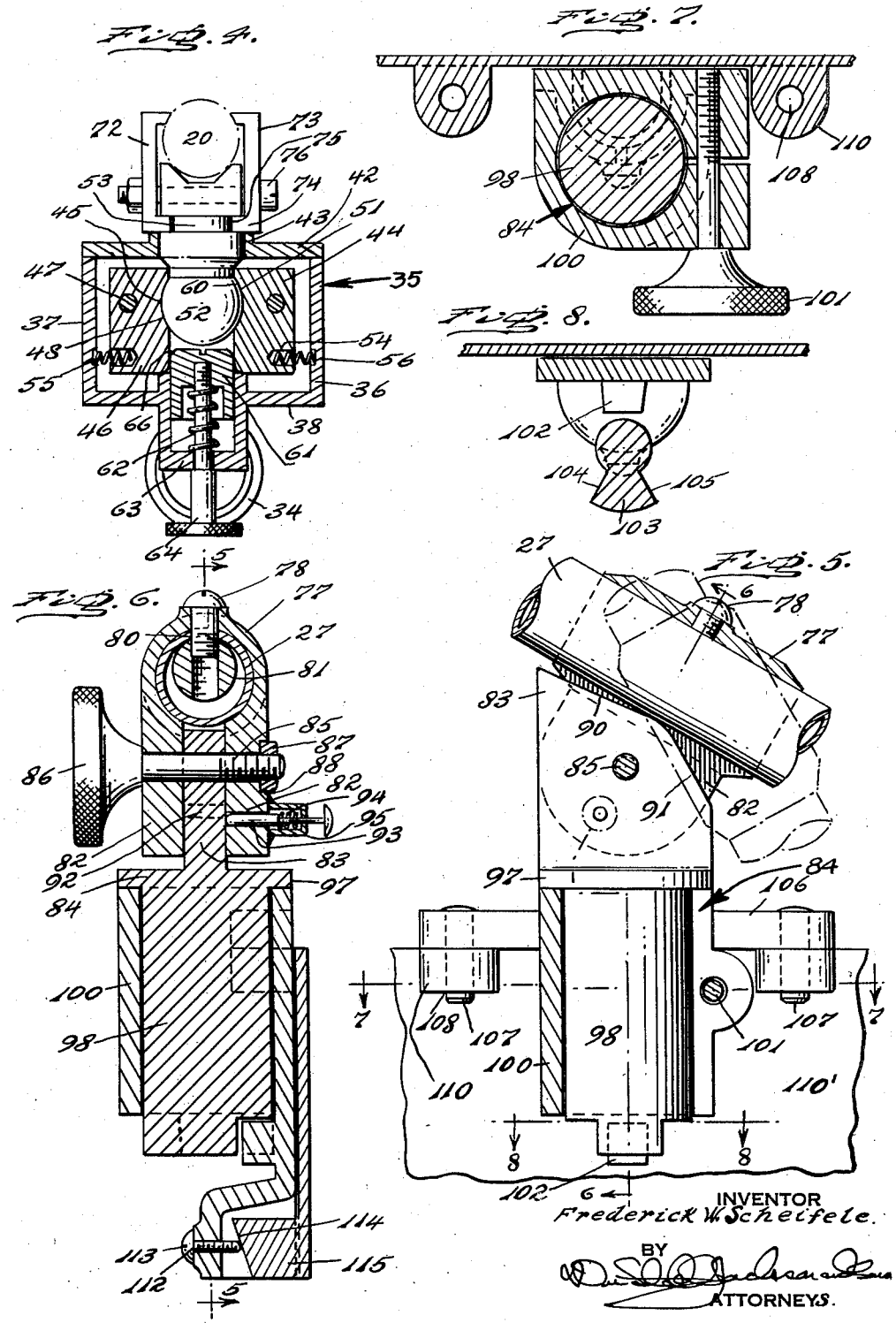
INVENTOR
Frederick W. Scheifele.
BY
ATTORNEYS.

Sept. 9, 1958    F. W. SCHEIFELE    2,851,234
FISHING ROD SUPPORT
Filed Feb. 23, 1952    3 Sheets-Sheet 3
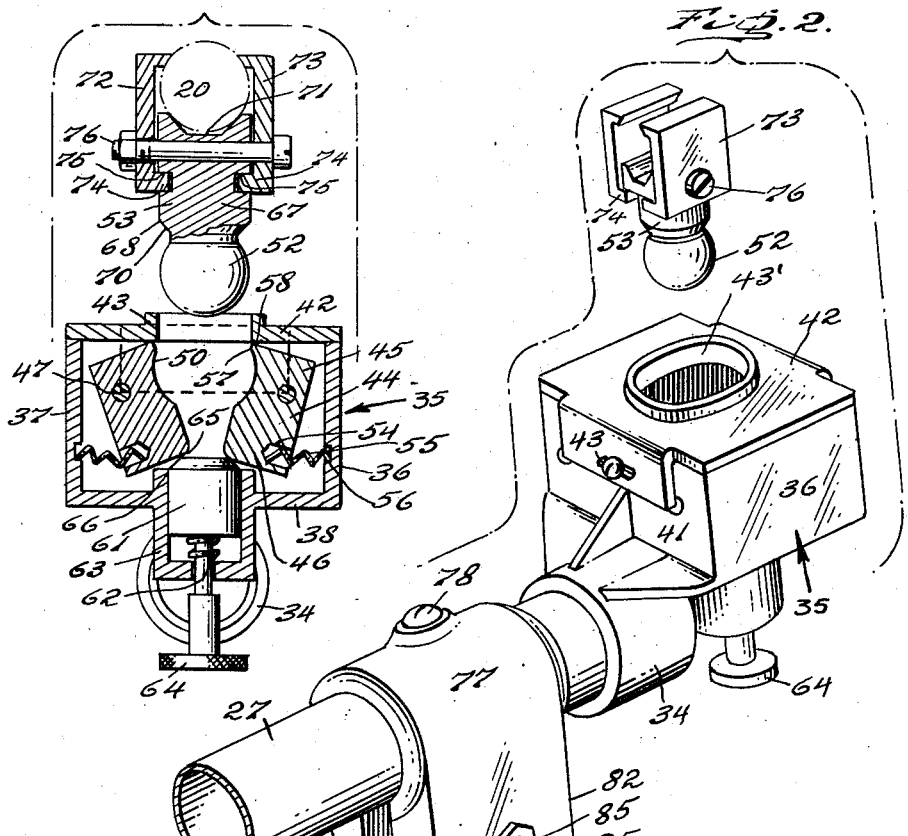
INVENTOR
Frederick W. Scheifele.
BY
ATTORNEYS.

United States Patent Office 2,851,234
Patented Sept. 9, 1958

2,851,234

FISHING ROD SUPPORT

Frederick W. Scheifele, Audubon, N. J.

Application February 23, 1952, Serial No. 272,924

3 Claims. (Cl. 248—42)

The present invention relates to brackets especially suited for mountings for deepsea fishing poles from fishing boats, but also suited for mounting other poles.

A purpose of the invention is to provide firm support of a pole with ready adjustment and ease in establishing and dislodging the mounting in the bracket.

A further purpose is to enable the user to throw the pole out of the way when contact with a dock or another boat is likely to occur.

A further purpose is to enable a fisherman who prefers to play the fish from an arm-supported position to remove the pole quickly from the bracket when he gets a strike.

A further purpose is to secure the back of the pole in a socket and to mount a more forward portion of the pole in a clamp by means of a dog.

A further purpose is to make the socket position adjustable.

A further purpose is to provide cooperating jaws pivotally mounted to engage the dog, resiliently urged toward open position and locked by a latch.

A further purpose is to lock the cooperating jaws in position gripping the dog by a latch which is pivotally mounted to move into and out of the space between the back of the jaws.

A further purpose is to provide a latch which turns about a pivot on an axis in prolongation of the dog, and thus to lock the jaws in gripping position.

A further purpose is to provide guides on a mounting plate which engage and hold wings on a pivot bearing member.

A further purpose is to swivel the bracket vertically and horizontally between limiting positions.

A further purpose is to mount the bracket on a vertical trunnion which is provided with a clamp and with limiters for controlling the angular position.

A further purpose is to secure the trunnion to a suitable vertical mounting plate by pin and socket engagement at the top and a clamp engagement at the bottom.

A further purpose is to mount the bracket arm to the trunnion on a horizontal pivot which is held in a preferred position by a latch.

Further purposes appear in the specification and in the claims.

In the drawings I have shosen to illustrate two only of the numerous embodiments in which my invention may appear, selecting the forms shown from the standpoints of convenience in illustration, satisfactory operation and clear demonstration of the principles involved.

Figure 1 is a side elevation of the bracket of the invention mounting a fishing pole partially shown in phantom from a boat also partially shown in phantom.

Figure 2 is a fragmentary exploded perspective of the bracket of Figure 1.

Figure 3 is a section of Figure 1 on the line 3—3 with the pole shown in phantom. In Figure 3 the dog and clamp are separated.

Figure 4 is a view corresponding to Figure 3 with the dog and clamp in clamping relation.

Figure 5 is a fragmentary section of Figure 6 on the line 5—5.

Figure 6 is a section of Figure 5 on the line 6—6.

Figure 7 is a section of Figure 5 on the line 7—7.

Figure 8 is a section of Figure 5 on the line 8—8.

Figure 9 is a section of Figure 1 on the line 9—9.

Figure 10 is a fragmentary top plan view of the lower end of the bracket arm.

Figure 11 is a diagrammatic front view, partly in section, of a modified form of gripping jaws and latch combination. Figure 11 shows the jaws in open position.

Figure 12 is a view corresponding to Figure 11 showing the jaws in gripping position with the latch closed.

Describing in illustration but not in limitation and referring to the drawings:

In deep sea fishing it is very desirable to provide the fisherman with a pole bracket in which the pole will be strongly supported against the pull of the fish and against the movement of the vessel, but will readily be removed from the bracket when a strike occurs, rebaiting is required, or the fisherman desires to handle the pole, and in which the pole can be quickly and securely returned to the bracket. In many of the prior art devices, the mechanism has been cumbersome and difficult to operate, especially with one hand.

In accordance with the present invention the pole is supported by a combination of a socket and the clamp mounted on a bracket arm which is desirably pivoted vertically and horizontally. The bracket arm is removable bodily from a mounting plate on the boat by detaching a clamp and pin-and-socket engagements. A vertical swivel is provided which can be clamped in any angular position and has limiters against excessive angular movement. The horizontal bearing is latched in a preferred position but can be quickly moved to another position. On the horizontal bearing the bracket arm is supported.

The pole is mounted from the bracket arm by a socket at the rear and a clamp at the front. In the preferred embodiment, the socket is rigid but adjustable, and the clamp cooperates with a dog on the pole and comprises swinging jaws.

An alternate form of latch is illustrated which holds the gripping jaws in closed position; this is accomplished by a turnable cam.

The traversing bearing of the device suitably has built in limiting faces to restrict the angle of turning.

Considering first the form of Figures 1 to 10 inclusive, a fishing pole 20 has a handle 21 provided with a rear end 22, a reel clamp 23, a reel 24 and a forward end 25. A suitable annular interiorly conical socket 26 extends laterally from and is directed parallel to the length of a bracket arm 27. The socket has a socket bracket 28 and socket holder 30 which is hollow and surrounds the arm 27 as best seen in Figure 9. A slot 31 runs longitudinally in the top of the bracket arm where the socket is located and screw 32 passes through the slot and threads into a nut-like longitudinally extending head 33 so that by loosening screw 32 the socket can be adjusted along the bracket arm.

At a suitable position forwardly on the bracket arm clamp support 34, surrounding and secured to the bracket arm by a screw not shown, mounts clamp 35 which extends upwardly to a position immediately below the line of the pole. Clamp 35 in the preferred embodiment is of the character shown in my copending application Serial No. 205,732, filed January 12, 1951, for Clamp, now U. S. Patent No. 2,722,727. The clamp suitably consists of a housing 36 of rectangular form having sides 37 and bottom 38, a forward end 40, a rear end 41 and a top 42 covered by a cover plate secured by screws 43 through slotted holes for adjustment, and having a central upwardly directed mouth ring 43'.

Within the housing, I provide opposite counterpart clamp jaws 44 on either side of the mouth. Each of the jaws has a side portion 45 toward the open mouth and a back portion 46 remote therefrom. Each side portion has a longitudinally extending pivot 47 which engages in the housing. The pivot is suitably near the middle of the side portion. The axes are parallel to one another and parallel to the axis of the object clamped. The back portion curves at 48 toward the opposite jaw.

The jaws have at least sufficient freedom so that they can move between an open position shown in Figure 3 and a closed position shown in Figure 4. In the open position shown in Figure 3 the jaws are placed with the back portions relatively close together, and the jaws open or diverge at 50 with respect to the plane connecting the axes of the pivots 47 (this is emphasized by the dotted lines).

On the other hand the jaws have a closed position as shown in Figure 4 in which the back jaw portions are more widely spaced than in the open position and the parts of the side jaw portions which are located slightly toward the mouth with respect to the plane connecting the axes of the pivots converge in surfaces 51 so as to grip a convex or spherical portion 52 of dog 53 which extends in through the mouth.

It will be evident that the movement from the open position to the closed position is produced by a force on the dog laterally of the axis of the fishing pole and transverse to the plane connecting the axes of the pivots 47, such as the pull of a fish when a bite is obtained on the fishing line having suitable drag, or pressure by the user.

On the opposite sides of the back jaw portions, sockets 54 are provided extending outwardly away from the opposite jaw and these received spiral compression springs 55 which act between the bottom of the spring socket 54 and the inside of the side wall of the housing where spring sockets 56 are located. The springs urge the jaws toward open positions.

The movement of the jaws toward open position is limited in any suitable manner, as for example by engagement of forward end portions 57 of the jaws on the top of the housing at 58.

The limitation on movement of the jaws toward closing in closed position is provided by engagement of the surfaces 51 of the jaws on the upper portion 60 of convex or spherical portion 52 of the dog. The jaws are clamped open by a latch 61 suitably of cylindrical plunger type which is urged by spiral compression spring 62 acting between latch housing 63 and the lower end of the latch. A latch operating knob 64 is suitably provided on the outer end of the latch. The rear edges of the jaws are suitably bevelled at 65 and the nose of the latch is bevelled at 66 so that the latch can move forward automatically when the jaws close and hold the jaws in closed position.

The dog 52 is suitably clamped around the fishing pole or rod adjacent the reel clamp. The dog consists of a body 67 which supports the convex portion 52, suitably a ball and provides an intermediate desirably cylindrical shank 68 which suitably closely fits the mouth ring 43 of the clamp and provides lateral anchorage of the fishing pole. An annular taper is provided at 70 between the ball and the shank to aid the entry of the dog into the mouth ring of the clamp.

The dog suitably has a recess 71 to conform to the bottom of the fishing pole and has clamping plates 72 and 73 engaging on either side of the pole, having at the lower ends offset portions 74 which fit into recesses 75 in the sides of the dog. A bolt 76 secures the clamping portions around the pole.

The bracket arm 27 at a suitable point intermediate its ends carries a sleeve 77 which surrounds the bracket and is suitably united thereto by a screw 78. The bracket arm is slotted at 80 where the screw 78 passes through for adjustment purposes and a nut-like head 81 threads with the screw on the inside (Figure 6).

Horizontal bearing lugs 82 in spaced relation extend downwardly from the sleeve 77 on either side of upstanding lug 83 from the top of swivel 84. Cooperating openings extend through the lugs and receive horizontal pivot bearing 85 which is provided with tightening knob 86 on one end and nut 87 threaded on the other anchored against turning in a non-circular nut receiving recess 88 in one of the lugs.

The swivel lug 83 has two angularly disposed limiting surfaces 90 and 91 (Figure 5) which engage the bracket arm in limiting positions and prevent excessive angular movement. At the preferred angular position for fishing (which is a downwardly disposed position compared to the elevated position), lug 83 is provided with latch opening 92 which is engaged by latch plunger 93, urged into latching position by spiral compression spring 94 in housing 95. The latch plunger is provided with a handle 96 for retracting.

The swivel 84 is flanged at the top at 97 and has a tubular bearing portion 98 which fits in a swivel socket bearing 100 of the interrupted clamp-type having a screw clamp 101 to tighten and hold the swivel in any desired position.

As shown best in Figure 8, the swivel bearing at one side near the bottom has a lug 102 which extends out into the path of a limiting cam 103 having limiting faces 104, 105, which engage the cam in either limiting position of rotation.

The swivel bearing 100 has near its upper end wing extensions 106 extending out to the sides and having downwardly directed pins 107 which are received in socket openings 108 of inwardly extending lugs 110 on a suitable vertical boat-mounted plate 110' desirably secured immediately inside the gunwale as by screws through openings 111. The swivel bearing is secured to the mounting plate at the bottom as by clamp 112 (Figure 6) comprising a screw 113 engaging a wedge surface 114 of an inwardly extending lug 115 which resists upward movement unless the clamp screw is released.

In operation of the form of Figures 1 to 10 inclusive, the bracket is suitably mounted to the boat by securing the mounting plate desirably on the inside of the gunwale. The bracket is then placed in position for adjustment by sliding the pins 107 into the sockets 108 and securing the clamp 112 on the wedge surface 114. The various other elements of the device can then be adjusted, and, retaining the adjustments, the bracket can be taken off and put on by releasing the clamp 112.

The horizontal angle is adjusted by releasing the swivel screw 101 and moving the clamp to the desired angular position and then again tightening the swivel screw.

The vertical position can be adjusted in either of two ways. If it is sufficient to use the preferred setting, clamping screw 85 can be kept reasonably loose and the plunger latch 93 engaged in the opening 92 to hold the bracket arm at the desired setting. The bracket arm can be thrown up quickly as in the case of landing at a dock by simply releasing the latch 93 and pulling the pole up and then locking screw 85.

If it is desired to use some other adjustment, this can be accomplished without using the plunger latch by locking screw 85 in the desired setting. The limiting positions are established by engagement of surfaces 90 and 91 with the bracket arm.

The longitudinal position of the bracket arm with respect to the swivel can be adjusted by loosening and tightening screw 78.

The fishing pole may be inserted in the bracket simply by inserting the rear end of the pole in socket 26 and pushing the dog previously attached to the pole into the clamp. As the dog is pushed in the ball or convex end forces the jaws into closed position and the latch 61 holds the jaws closed. The dog is secured against lateral movement by engagement around the mouth ring 43 of top plate 42 with the shank portion of the dog.

If desired the user may leave the fishing pole with the rear end resting in the socket and the dog resting in the open clamp with the assurance that the pull on the forward end of the pole caused by a strike will force the dog into the clamp.

In some cases it is desirable to use a rotational latch and this is shown in Figures 11 and 12 where the gripping jaws 44 in open positoin as shown in Figure 11 are separated by the narrow latch edge 175 on latch 61² having a round stem 176 passing from the bottom of the housing, and carrying a lever 177 on the latch outside the housing which is swingable back and forth. When the gripping jaws are in engagement with the dog 52 the latch 61² is swung at right angles to bring cam 178 between the backs of the jaws.

It will be evident that in accordance with the invention a wide variety of adjustments can be made, suiting the particular position chosen to the tests and physical requirements of the user.

In view of my invention and disclosure variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described my invention, what I claim as new and desire to secure by Letters Patent is:

1. In a support for a fishing pole or the like, a socket adapted to receive and hold the rear end of a fishing pole, a bracket secured to and supporting the socket, a dog having a convex end adapted to be mounted on the fishing pole forward of its rear end and a clamp mounted on the bracket forward of the socket and comprising a pair of opposite counterpart jaws which form a clamping socket which receives the convex end of the dog, each of the jaws having a side jaw portion and back jaw portion and the jaws being open at a mouth opposite to the back jaw portions, each of the jaws being pivoted through its side jaw portion on pivots parallel to one another, the jaws having an open position in which the back jaw portions are close together and engage and prevent the convex end of the dog from moving further into the jaws without displacing the back jaw portions farther apart and in which the side jaw portions are generally open or diverging from a plane connecting the axes of the pivots outwardly toward the mouth, and having a closed position in which the back jaw portions are more widely spaced than in the open position and the side jaw portions converge from the plane connecting the pivotal axes outward toward the mouth and grip the convex end of the dog against movement out of the mouth, the jaws being urged from open to close position by pressure of the convex end of the dog on the back jaw portions transverse to the plane connecting the pivotal axes, resilient means urging the jaws toward open position and latch means holding the jaws in closed position by engagement between the back jaw portions when the jaws are closed, whereby the pole can be retained with the rear end in the socket and the convex end of the dog resting in the clamping socket and engaging the back jaws portions, and when pressure is applied downward on the forward end of the pole the convex end of the dog forces the jaws into closed position, the pole pivoting slightly on the socket at the rear.

2. A support according to claim 1, in which the clamp has a mouth ring around the mouth, in combination with a neck portion on the dog engaging the mouth ring when the dog passes through the mouth.

3. A support according to claim 1, in which the latch is a cam turning on a pivot generally in prolongation of the dog between the back portions of the jaws and in one position holding the jaws in engagement with the dog.

References Cited in the file of this patent

UNITED STATES PATENTS

| | | |
|---|---|---|
| D. 136,856 | Olowecki | Dec. 14, 1943 |
| 458,756 | Merk | Sept. 1, 1891 |
| 483,963 | Teger | Oct. 4, 1892 |
| 610,738 | Finnegan | Sept. 13, 1898 |
| 1,006,109 | Malmstrom | Oct. 17, 1911 |
| 1,261,894 | Barnes | Apr. 9, 1918 |
| 1,302,125 | Bechoff et al. | Apr. 29, 1919 |
| 1,379,060 | Bacheldor | June 26, 1925 |
| 1,789,509 | Bergstrom | Jan. 20, 1931 |
| 1,848,430 | Morris | Mar. 8, 1932 |
| 2,220,234 | Hadaway | Nov. 5, 1940 |
| 2,236,070 | Rohrdanz | Mar. 25, 1941 |
| 2,314,747 | White | Mar. 23, 1943 |
| 2,430,112 | Hamre | Nov. 4, 1947 |
| 2,454,458 | Kaetker | Nov. 23, 1948 |
| 2,484,427 | Sahwenk | Oct. 11, 1949 |
| 2,522,255 | Climo | Sept. 12, 1950 |
| 2,542,696 | Nelson | Feb. 20, 1951 |
| 2,546,280 | Stein | Mar. 27, 1951 |
| 2,552,639 | Menegay | May 15, 1951 |
| 2,614,781 | Engel | Oct. 21, 1952 |
| 2,645,439 | Ganthier | July 14, 1953 |
| 2,693,332 | Albert | Nov. 2, 1954 |